United States Patent [19]
Thornton et al.

[11] Patent Number: 6,002,902
[45] Date of Patent: Dec. 14, 1999

[54] PUZZLE CUT SEAMED BELT HAVING ULTRAVIOLET CURABLE ADHESIVE SEAM AND METHODS THEREOF

[75] Inventors: Constance J. Thornton, Ontario; Edward L. Schlueter, Jr.; Thomas E. Brothers, both of Rochester, all of N.Y.

[73] Assignee: Xerox Corporation, Stamford, Conn.

[21] Appl. No.: 09/199,757

[22] Filed: Nov. 25, 1998

[51] Int. Cl.⁶ .................................................. G03G 15/00
[52] U.S. Cl. ............................................ 399/162; 474/253
[58] Field of Search ........................... 399/162; 474/253, 474/250, 252

[56] References Cited

U.S. PATENT DOCUMENTS

| | | | |
|---|---|---|---|
| 5,413,810 | 5/1995 | Mastalski | 427/171 |
| 5,487,707 | 1/1996 | Sharf et al. | 474/253 |
| 5,514,436 | 5/1996 | Schlueter, Jr. et al. | 428/57 |
| 5,549,193 | 8/1996 | Schlueter, Jr. et al. | 198/844.2 |
| 5,825,549 | 10/1998 | Kawamata et al. | 359/582 |

*Primary Examiner*—William Royer
*Assistant Examiner*—Greg Moldafsky
*Attorney, Agent, or Firm*—Annette L. Bade

[57] ABSTRACT

An ultraviolet curable adhesive for use in bonding seams of endless flexible seamed belts, sheets or films, and preferably for use with puzzle cut seams, wherein there is virtually no thickness differential at the seam and the seam has a pull strength of from about 15 to about 50 pounds/inch.

19 Claims, 10 Drawing Sheets

PUZZLE CUT SEAMED BELT HAVING ULTRAVIOLET CURABLE ADHESIVE SEAM AND METHODS THEREOF

CROSS REFERENCE TO RELATED APPLICATIONS

Attention is directed to co-pending application U.S. application Ser. No. 09/200,235 filed on Nov. 25, 1998 entitled, "Puzzle Cut Seaming Apparatus Using Ultraviolet Cure;" U.S. application No. 09/199,754 filed on Nov. 25, 1998 entitled, "Puzzle Cut Seaming Process Using Ultraviolet Cure." The disclosure of each of these references is hereby incorporated by reference in their entirety.

BACKGROUND OF THE INVENTION

The present invention relates to a puzzle cut seamed belt useful in electrostatographic reproducing apparatus, including digital, image on image and contact electrostatic printing apparatuses. The present belts can be used as fuser belts, pressure belts, intermediate transfer belts, transfuse belts, transport belts, developer belts, photoreceptor belts, and the like. Preferably, the puzzle cut seam is secured via an ultraviolet curable adhesive. Also, preferably, the adhesive is cured via ultraviolet light. In a particularly preferred embodiment, the puzzle cut seam has a pull strength of from about 15 to about 50 pounds/inch.

In a typical electrostatographic reproducing apparatus such as electrophotographic imaging system using a photoreceptor, a light image of an original to be copied is recorded in the form of an electrostatic latent image upon a photosensitive member and the latent image is subsequently rendered visible by the application of electroscopic thermoplastic resin particles which are commonly referred to as toner. Generally, the electrostatic latent image is developed by bringing a developer mixture into contact therewith. Toner particles are attracted from the carrier granules to the latent image forming a toner powder image thereon. Alternatively, a liquid developer material may be employed. After the toner particles have been deposited on the photoconductive surface, in image configuration, the developed image is transferred to a receiving copy substrate. The image is subsequently fused to a copy substrate by the application of heat in combination with pressure.

Belts, sheets, films and the like are important to the xerographic process. In addition, belt function is very much affected by the seam of the belt. For example, belts formed according to known butting or overlapping techniques provide a bump or other discontinuity in the belt surface leading to a height differential between adjacent portions of the belt, of 0.010 inches or more depending on the belt thickness. This increased height differential leads to performance failure in many applications. A bump, surface irregularity, or other discontinuity in the seam of the belt may disturb the tuck of the cleaning blade as it makes intimate contact with the photoconductive member surface to effect residual toner and debris removal. This may allow toner to pass under the blade and not be cleaned. Furthermore, seams having differential heights may when subjected to repeated striking by cleaning blades, cause photoconductive member cycling speed disturbance which affects the crucial photoconductive belt motion quality. Moreover, seams with a bump or any morphological defects can facilitate the untransferred, residual toner to be trapped in the sites of seam surface irregularities. The seam of a photoreceptor belt which is repeatedly subjected to the striking action by a cleaning blade under machine functioning conditions has triggered the development of pre-mature seam delamination failure. As a result, both the cleaning life of the blade and the overall service life of the photoreceptor belt can be greatly diminished. In addition, the copy quality of image printout can be degraded. Moreover, such irregularities in seam height provide vibrational noise in xerographic development which disturb the toner image on the belt and degrade resolution and transfer of the toner image to the final copy sheet. This is particularly prevalent in those applications requiring the application of multiple color layers of liquid or dry developer on a photoreceptor belt, which are subsequently transferred to a final copy sheet. In addition, the discontinuity in belt thickness due to the presence of an excessive seam height yields variances of mechanical strength in the belt as well as reducing the fatigue flex life of the seam when cycling over the belt module support rollers. Further, the seam discontinuity or bump in such a belt may result in inaccurate image registration during development, inaccurate belt tracking and overall deterioration of motion quality, as a result of the translating vibrations.

Moreover, belts have been prepared in the past by ultrasonic welding which requires high temperature curing of the material between the seam. Such high temperatures cause spattering of the melted material which forms peaks in the seam area. These peaks result in disturbance of components such as corotron wires in the case of charging a photoreceptor belt. Such high temperatures also tend to disturb the orientations of the photoreceptor material. For example, many photoreceptors comprise biaxially oriented polyethylene terephthalate (PET). The high temperatures necessary for curing tend to disturb the orientation of the PET causing a ripple in the seam area. Under machine tension, this ripple is distributed along the length of the belt.

The belts herein comprise ultraviolet curable adhesives. Therefore, there is no need for use of such high temperatures used in ultrasonic welding. Accordingly, the belt material is not disturbed and the ripple effect is reduced or eliminated. Further, by use of ultraviolet curable adhesives, spattering of melted material in the seam area is reduced or eliminated, resulting in a decrease in the disturbance of components with which the belt may come in contact. In addition, by use of the ultraviolet curable adhesives, a strong bond is formed, resulting in a significant increase in pull strength and flex life. Further, the height difference between the puzzle cut seam members and adjacent portions of the belt is reduced to nearly nil, resulting in a smooth seam, increase in flex life of the belt, and little or no ripple effect.

However, currently belt seams using ultraviolet curable adhesives require relatively long cure times, for example, up to about 30 minutes. This increases belt fabrication time, resulting in an inefficiency in belt production.

U.S. Pat. No. 5,487,707 relates to an endless flexible seamed belt comprising puzzle cut members, and further comprising a bonding between adjacent surfaces by an ultraviolet cured adhesive.

U.S. Pat. No. 5,514,436 relates to an endless flexible seamed belt having puzzle cut seams and wherein the seam is of a substantially uniform thickness as the rest of the belt.

U.S. Pat. No. 5,549,193 relates to an endless flexible seamed belt formed comprising puzzle cut members, wherein at least one receptacle has a substantial depth in a portion of the belt material at the belt ends.

Although the above references teach interlocking seams which provide for decreased inherent seam height, increased seam strength, decreased surface roughness at the seam, and increased continuity at the seam, there still exists a need for a seam which has increased seam bonding strength to prevent premature delamination, tearing or rupture. Further, there is a need for an improved belt having a seam which provides a decreased or eliminated ripple effect. In addition, it is desired to provide a seam with virtual nil thickness differential with the main body of the belt, as well as a belt with good tensile and bending flexibility. Moreover, there is a need for a belt which is easily and quickly fabricated.

SUMMARY OF THE INVENTION

Embodiments of the present invention include: an endless seamed flexible belt comprising a first end and a second end together which form a seam which extends linearly across a width of said belt, wherein the first end and second end both comprise mutually mating elements in a puzzle cut pattern, the mutually mating elements interlocking to form the seam, wherein the seam comprises an ultraviolet curable adhesive to bond the mutually mating elements of the first end and the second end, wherein there is virtually no thickness differential between the seam and adjacent interlocking mutually mating elements, and wherein the seam has a pull strength of from about 15 to about 50 pounds/inch.

Embodiments also include: an image forming apparatus for forming images on a recording medium comprising a charge-retentive surface to receive an electrostatic latent image thereon, wherein the charge-retentive surface comprises an endless seamed flexible belt comprising a first end and a second end together which form a seam which extends linearly across a width of the belt, wherein the first end and second end both comprise mutually mating elements in a puzzle cut pattern, the mutually mating elements interlocking to form the seam, wherein the seam comprises an ultraviolet curable adhesive to bond the mutually mating elements of the first end and the second end, wherein there is virtually no thickness differential between the seam and adjacent interlocking mutually mating elements, and wherein the seam has a pull strength of from about 15 to about 50 pounds/inch; a development component to apply toner to the charge-retentive surface to develop the electrostatic latent image to form a developed image on the charge retentive surface; a transfer film component to transfer the developed image from the charge retentive surface to a copy substrate; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having improved adhesion at the seam, increased bonding strength, and virtual uniform thickness at the seam. In addition, the belt, in embodiments, provides a decrease in ripple effect, thereby resulting in a decrease or elimination of interference with other components that come in contact with the belt during normal cycling. The present invention, in embodiments, allows for relatively fast preparation and manufacture of xerographic components that reduces seam fabrication cycle time due to the decrease in ultraviolet cure time. Furthermore, the seam has increased seaming bonding strength to decrease tearing as well as enhance the seam's tensile rupture resistance. Moreover, in embodiments, the seam has a decreased and virtually nil seam height which allows for superior cleaning efficiency and superior hybrid scavengeless development efficiency.

In preferred embodiments, the belt is a photoreceptor belt, sheet, or film useful in xerographic, including digital, image on image, and contact electrostatic printing apparatuses. However, the belts herein can be useful as belts for many different processes and components such as photoreceptors, intermediate transfer members, fusing members, transfix members, bias transfer members, bias charging members, developer members, image bearing members, conveyor members, and other members for contact electrostatic printing applications, xerographic applications, including digital, image on image, and contact electrostatic printing. The belts are prepared using a process which forms a strength enhancing bond between voids of mutually mating elements. The strength enhancing bond comprises a material which is chemically and physically compatible with the material of the coating layers of the belt.

Figure 1:
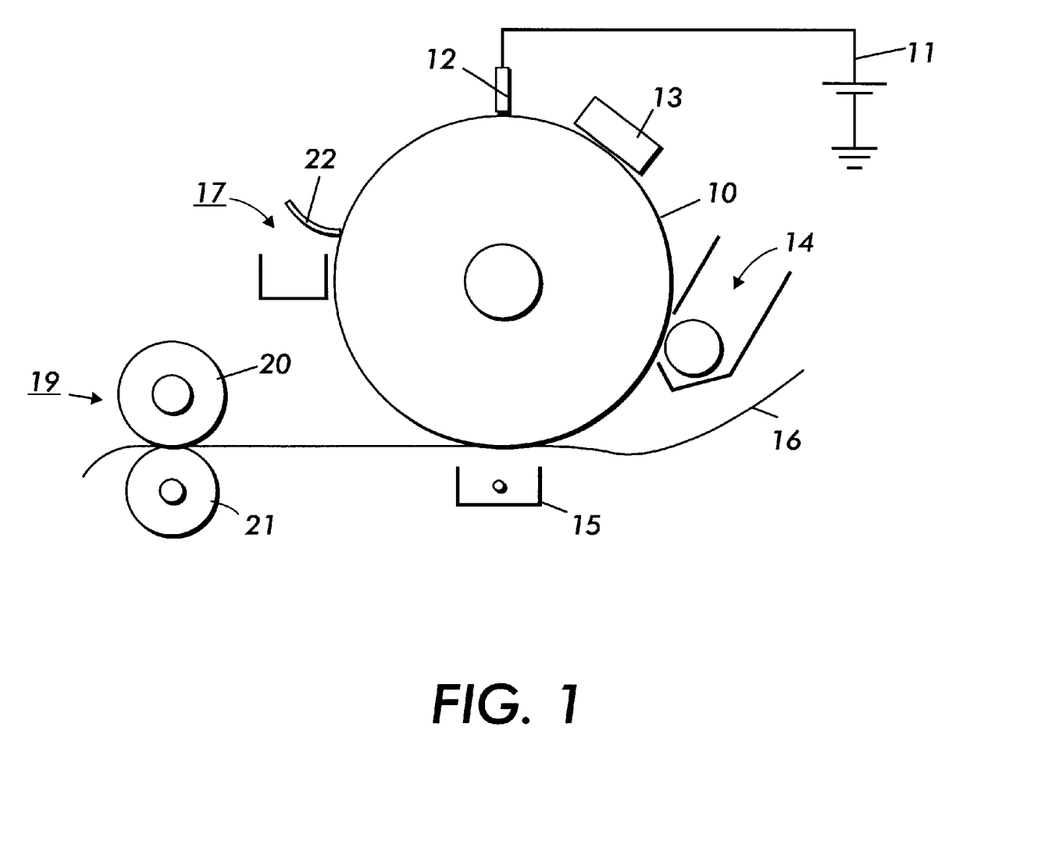
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member. The latent image is subsequently rendered visible by the application of electroscopic thermoplastic resin particles which are commonly referred to as toner. Specifically, photoreceptor 10 is charged on its surface by means of a charger 12. A voltage is supplied from power supply 11. The photoreceptor is then imagewise exposed to light from an optical system or an image input apparatus 13, such as a laser and light emitting diode, to form an electrostatic latent image thereon. Generally, the electrostatic latent image is developed by contacting the image with a developer mixture from developer station 14. Development can be effected by use of a magnetic brush, powder cloud, or other known development process.

After the toner particles have been deposited on the photoconductive surface, in image configuration, they are transferred to a copy sheet 16 by transfer means 15. Transfer means 15 can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls. At fusing station 19, the developed image is fused to copy sheet 16 by passing copy sheet 16 between the fusing member 20 and pressure member 21, thereby forming a permanent image. Fusing may alternatively be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
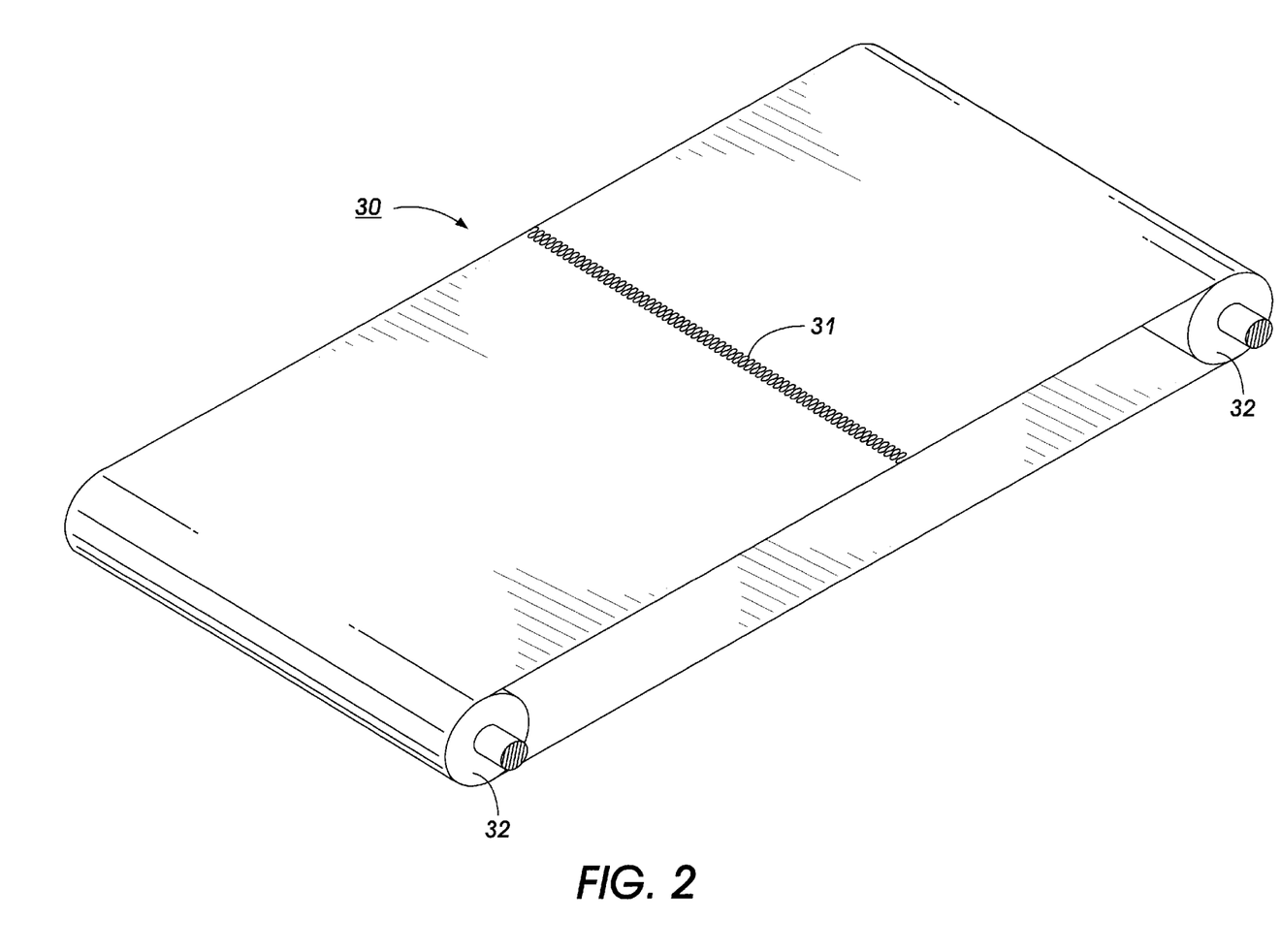
FIG. 2 is an enhanced view of an embodiment of a belt configuration and seam according to the present invention.

FIG. 2 demonstrates an example of an embodiment of a belt in accordance with the present invention. Belt 30 is demonstrated with seam 31. Seam 31 demonstrates an example of one embodiment of a puzzle cut seam. The belt is held in position and turned by use of rollers 32. Note that the mechanical interlocking relationship of the seam 31 is present in a two dimensional plane when the belt 30 is on a flat surface, whether it be horizontal or vertical. While the seam is illustrated in FIG. 2 as being perpendicular to the two parallel sides of the belt, it should be understood that the seam may be angled or slanted with respect to the parallel sides. Angling the seam enables any noise generated in the system to be distributed more uniformly and the forces placed on each mating element or node to be reduced.

In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end, and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In embodiments, the seam including the puzzle cut members, is held together by an ultraviolet curable adhesive, which provides improved seam quality and smoothness with substantially no thickness differential between the seam and the adjacent portions of the belt. This improved belt provides enhanced imaging, registration and control as discussed above, in addition to a decrease or elimination of ripple effect. In this regard, it should be noted that the lower the differential in seam height, the less the mechanical action force against a cleaning blade and machine subsystems. Therefore, the traveling speed variance is lessened.

Figure 3:
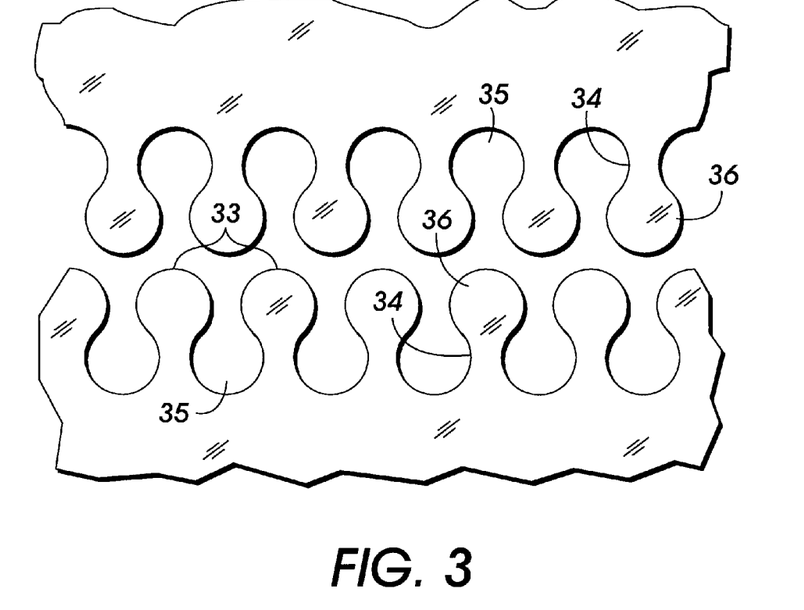
FIG. 3 is an enlargement of a puzzle cut seam having a head and neck members according to one embodiment of the present invention.
Figure 4:
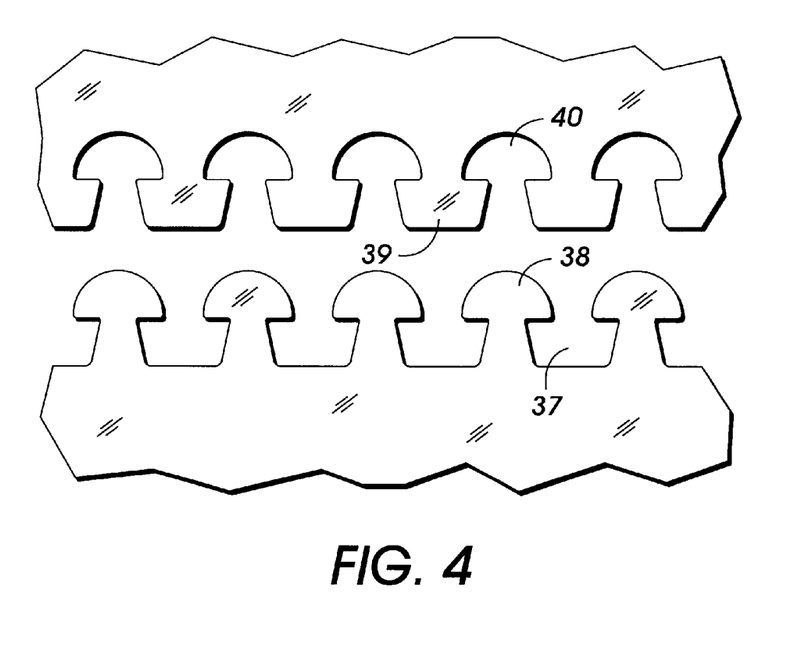
FIG. 4 is an enlargement of a puzzle cut seam having mushroom-shaped puzzle cut members according to another embodiment of the present invention.
Figure 5:
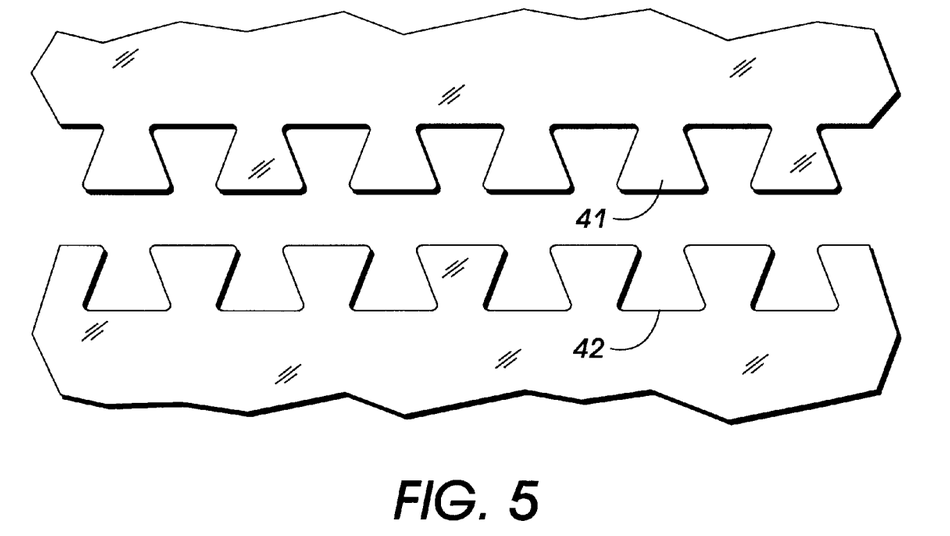
FIG. 5 is an enlargement of a puzzle cut seam having dovetail members according to another embodiment of the present invention.
Figure 6:
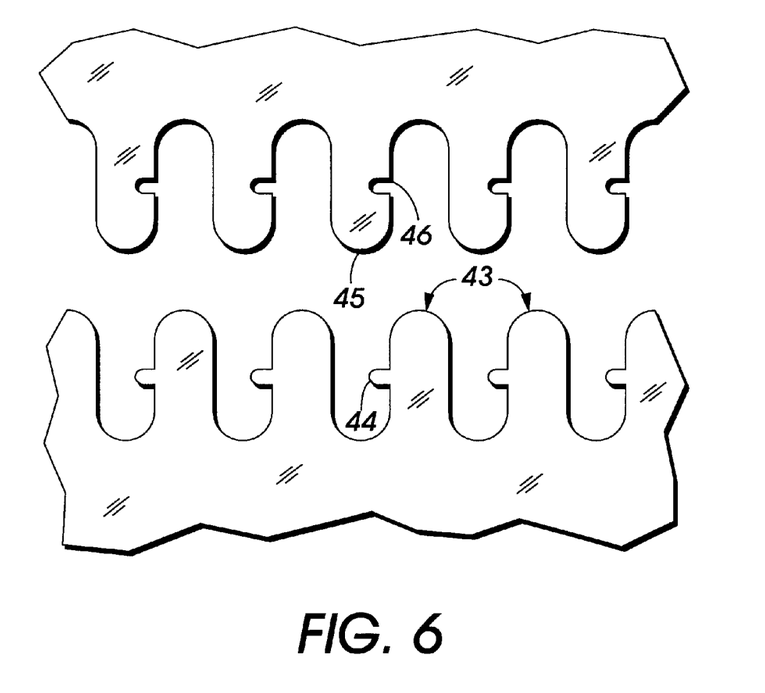
FIG. 6 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 3. The puzzle cut pattern may take virtually any form, including that of nodes such as identical post or neck 34 and head 33 or node patterns having projections 36 and receptacles 35 which interlock when brought together as illustrated in FIG. 3. The puzzle cut pattern may also be of a more mushroom-like shaped pattern having first projections 38 and 39 and second receptacles 40 and 37 as illustrated in FIG. 4, as well as a dovetail pattern as illustrated in FIG. 5 having first projections 41 and second receptacles 42. The puzzle cut pattern illustrated in FIG. 6 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 2. It has been found that with curved mating elements that the stress concentration is lower than with square corners where rather than the stress being uniformly distributed it is concentrated leading to possible failure.

Figure 7:
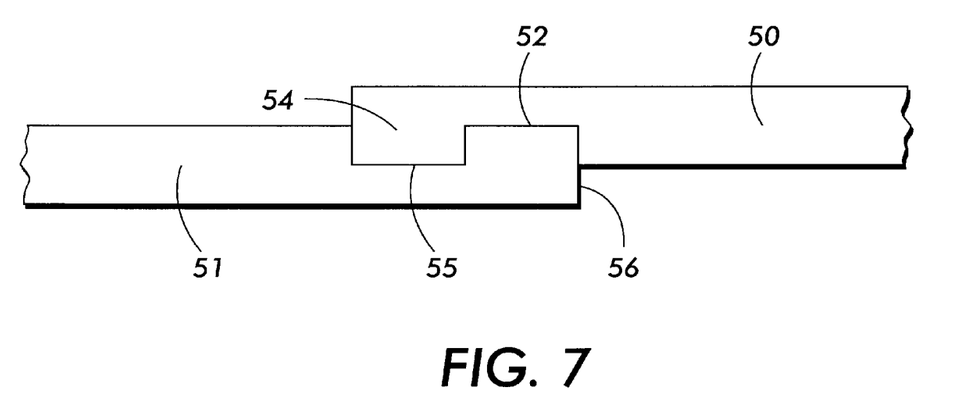
FIG. 7 is an enlargement of a puzzle cut seam having receptacle and projection members of differing depth according to another embodiment of the present invention.

Another example of a puzzle cut seam is shown in FIG. 7. Therein, the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

It is preferred that the height differential between the seam and the rest of the belt (the unseamed portions of the belt) be practically nil, or from about 0 to about 50 micrometers, preferably from about 0.0001 to about 25 micrometers, and particularly preferred of from about 0.01 to about 20 micrometers.

Figure 8:
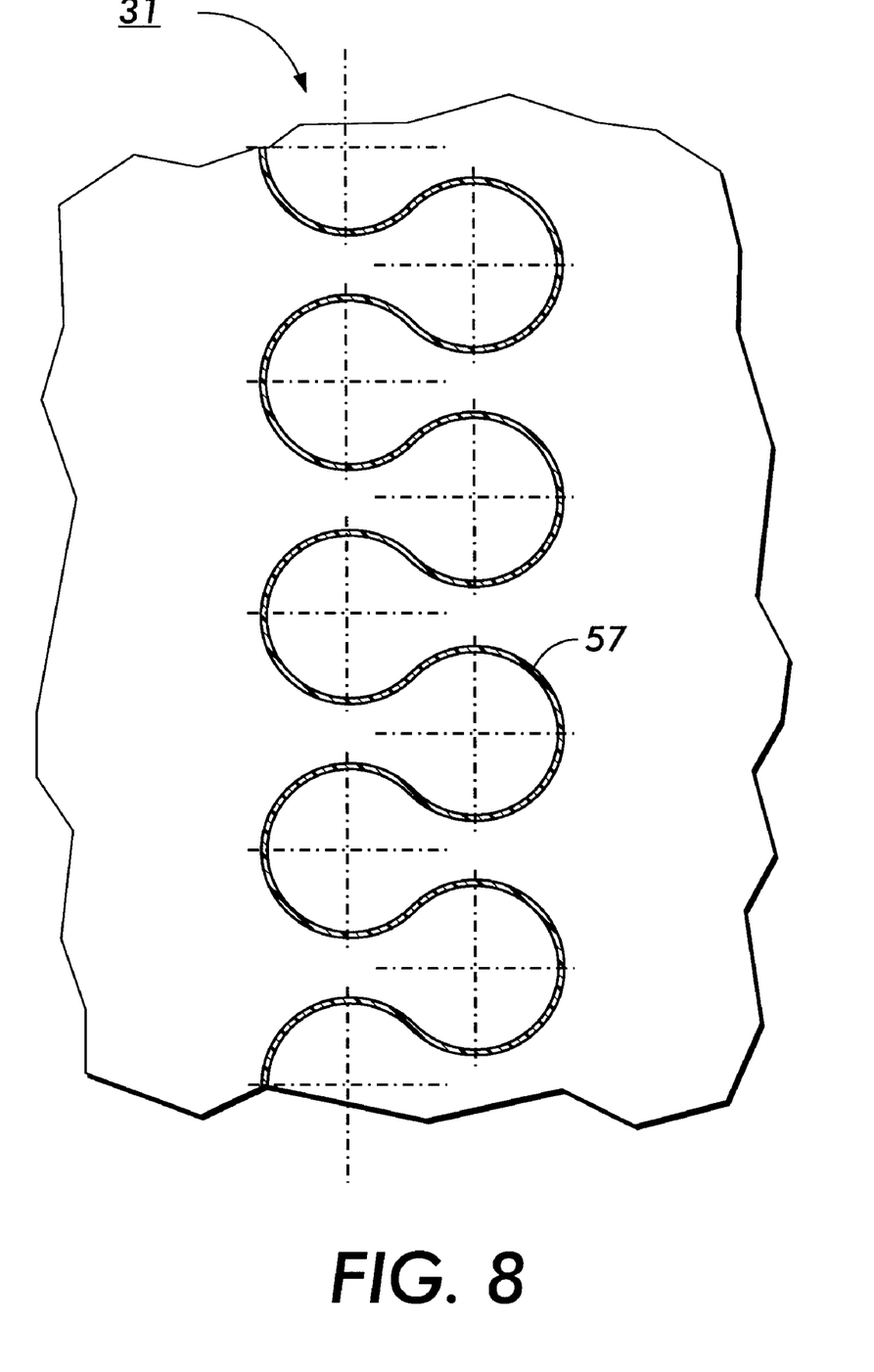
FIG. 8 is an enlarged version of a belt according to one embodiment of the present invention and demonstrates a crevice between the puzzle cut members, the crevice containing an adhesive.

An adhesive is preferably present between the seam, and placed in the crevice between the puzzle cut members to a thickness of from about 0.0001 about 25 micrometers. As shown in one embodiment of a puzzle cut seam 31 according to the present invention, the adhesive is present between the puzzle cut members and at the seam crevice 57 of FIG. 8.

A preferred adhesive for use with the puzzle cut belt seam is an ultraviolet curable adhesive. Examples of suitable ultraviolet curable adhesives include epoxies, and especially acrylic epoxies. Specific examples include LIGHT WELD® 438 and LIGHT WELD® 469 available from DyMax Corporation; ENXIBAR® UV 1244 from Alpha Metals; Loctite 3106, 3105 and LITE TAK® 3761 from Loctite Corporation; UV 1004-LV550 from Rad Cure Corporation; EMCAST® 1900, EMCAST® 1900LV, EMCAST® 1904, and EMCAST® 1900XP from Electronic Materials, Inc.; LUX TRAK 4124 (LCM 24) and LUCTREK 4170 (LCM 35) from AbleStik; and like ultraviolet curable adhesives. Preferably, the adhesives have a viscosity of from about 100 to about 5000 centepoise, preferably from about 200 to about 1,000 centepoise. The ultraviolet curable adhesive eliminates the need for high temperatures normally necessary for curing adhesives into seams for seam bonding. The ultraviolet curable adhesive is placed between the mutually mating seam elements, in the void or crevice between seam members. The seam is then cured using ultraviolet light. Curing may be accomplished by pulsed curing, or a continuous ultraviolet curing procedure. Preferably, the ultraviolet curable adhesive is transparent to enable the radiation to penetrate through the adhesive to provide a complete cure.

Figure 10:
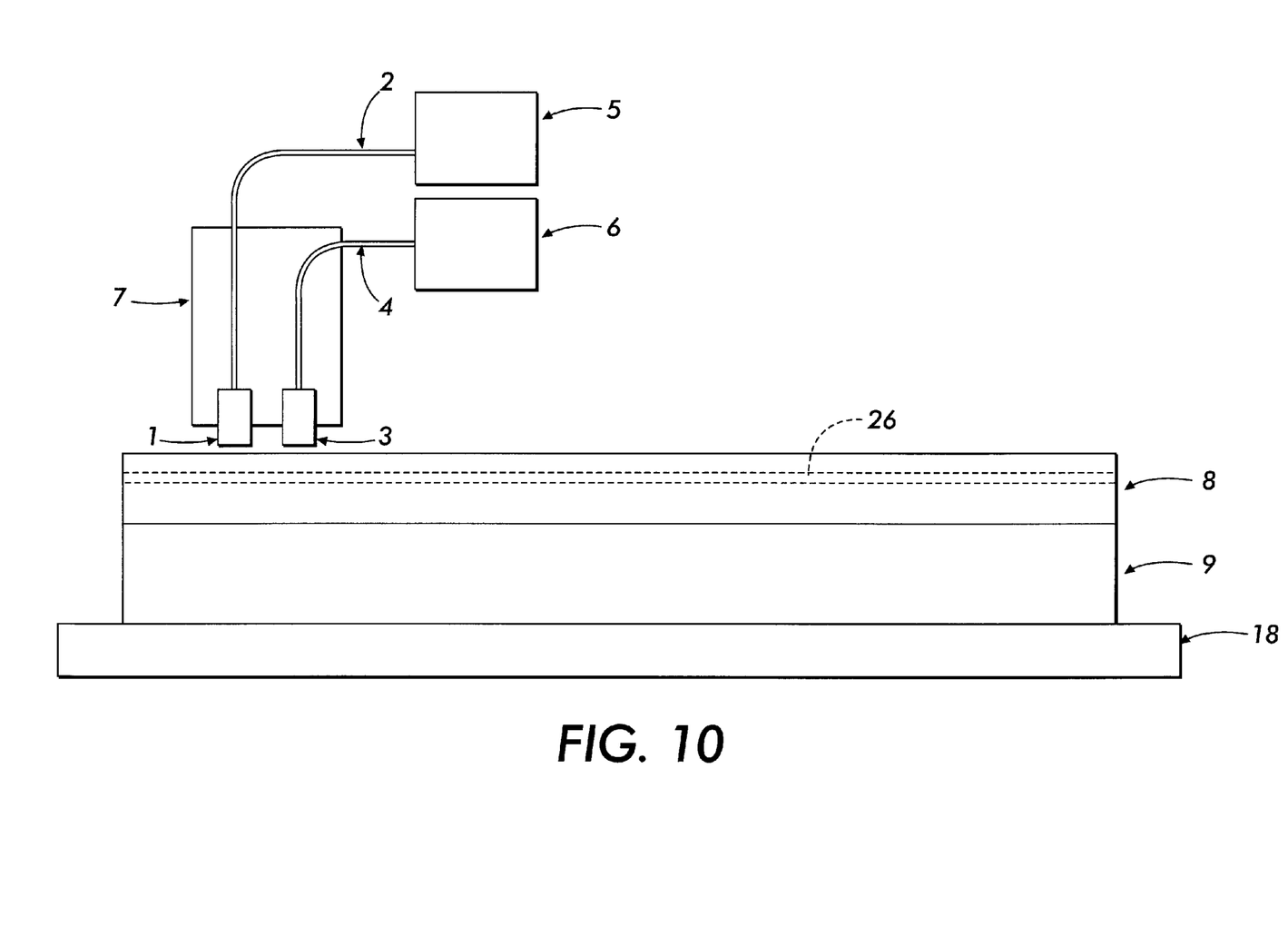
FIG. 10 is a depiction of a puzzle cut seaming apparatus, according to a preferred embodiment of the invention.
Figure 11:
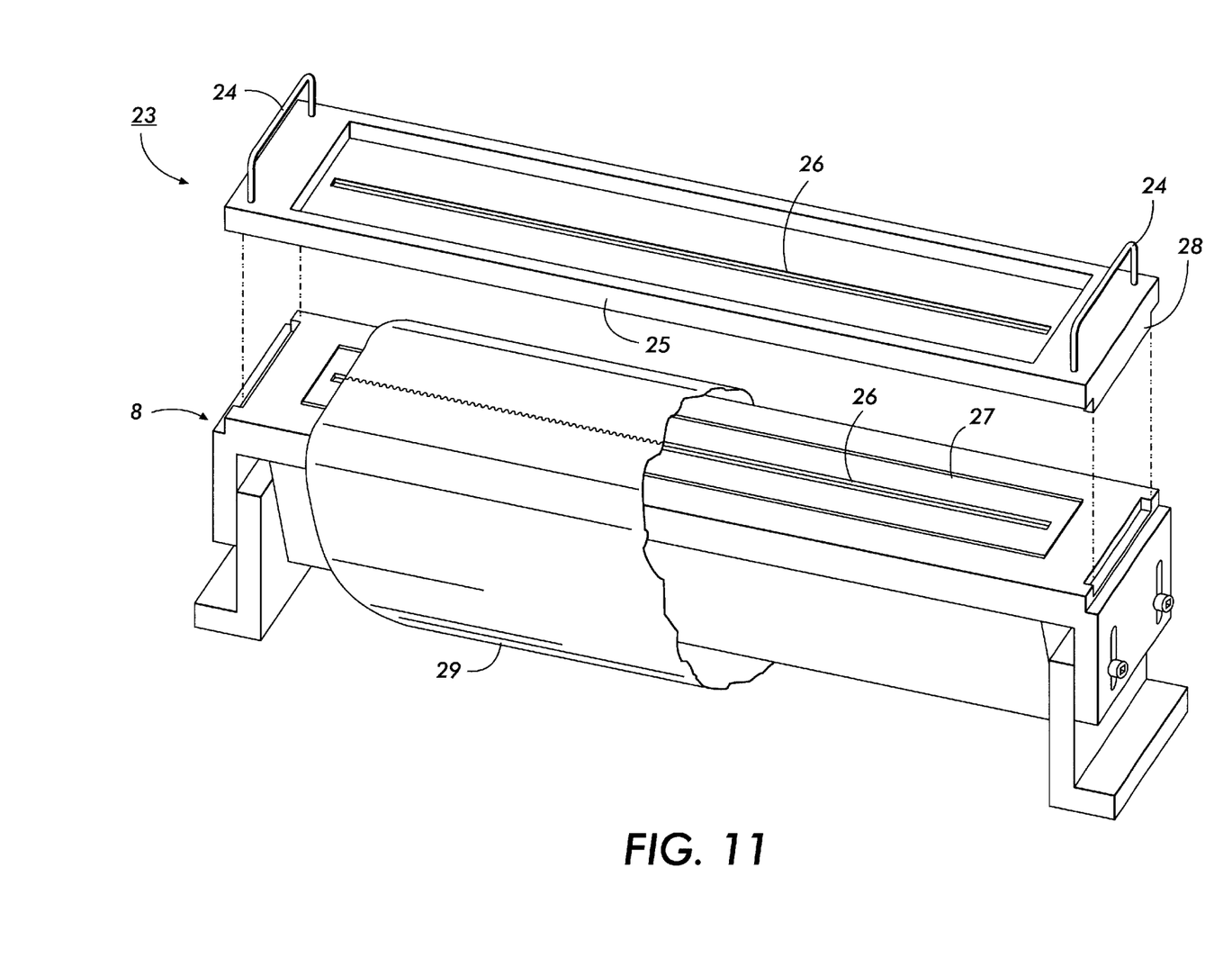
FIG. 11 is an overhead view of an embodiment of a belt securing device and belt positioning device.
Figure 12:
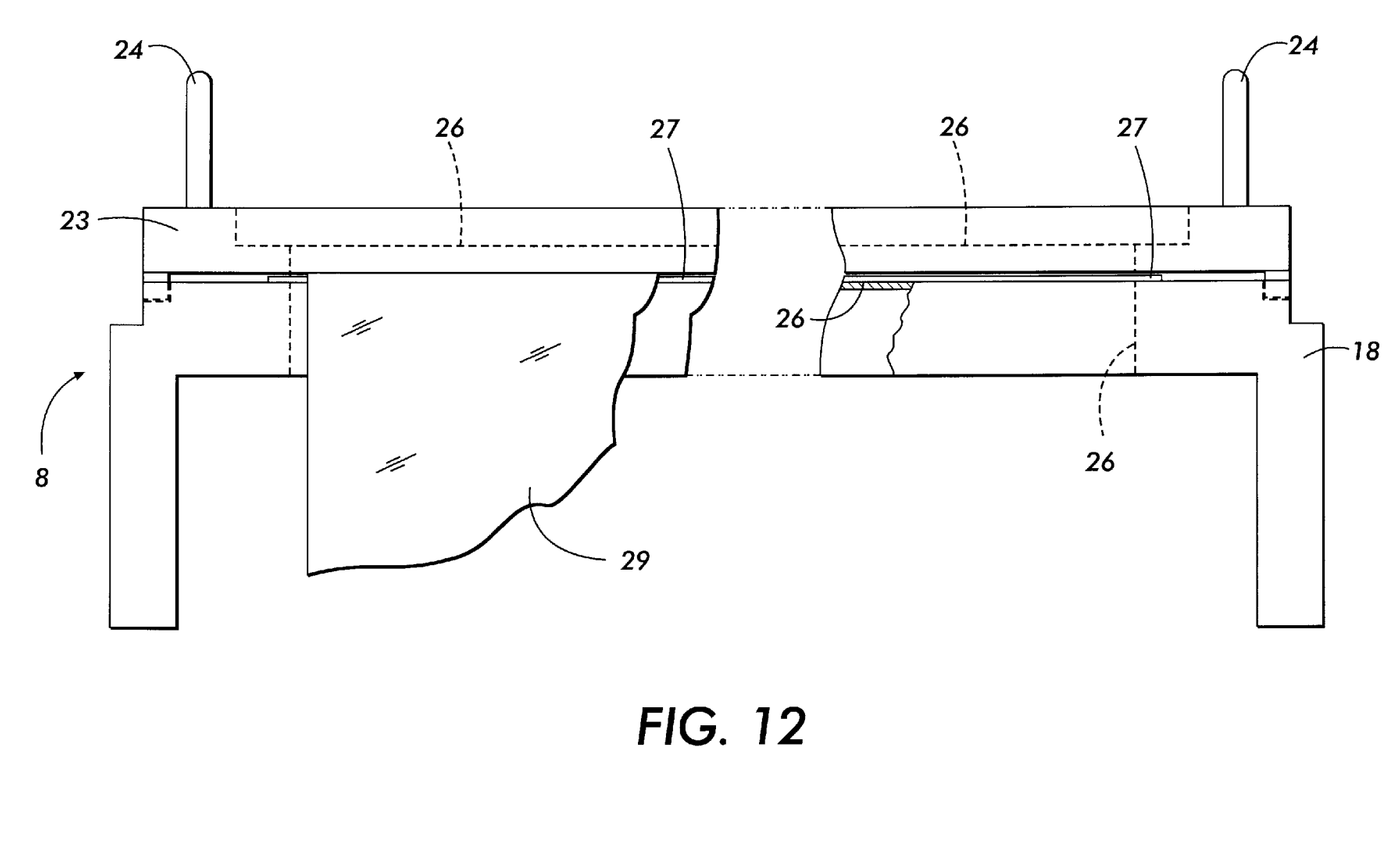
FIG. 12 is an enlarged cross-sectional view of an embodiment of a belt positioning device in accordance with the present invention.

In a preferred embodiment of the invention, the seam is made by dispensing a suitable adhesive, and curing the adhesive in the seam with ultraviolet light, by use of a puzzle cut seaming apparatus. An example of such an apparatus is depicted in FIGS. 10, 11 and 12. FIG. 10 depicts an example of a preferred apparatus according to an embodiment of the present invention. FIG. 10 depicts a belt positioning device 8 having aperture 26 therein. Preferably, aperture 26 has a width corresponding to the width of the puzzle cut seam. Aperture 26 has a length that corresponds to the length of belt positioning device 8, and that corresponds to the length of the belt seam on the portion of the belt which is subjected to seaming and curing. Positioned under the belt positioning device is an indirect UV power source 9. A second UV source is depicted as direct UV source 1 in FIG. 10, in combination with direct UV source line 2 which attaches to UV power source 5. Adhesive dispenser 3 is shown in combination with adhesive dispenser line 4. Line 4 attaches to adhesive container 6 which stores the adhesive for dispensing via adhesive dispenser 3 along the puzzle cut seam. When a puzzle cut un-seamed belt having two ends is placed on belt positioning device 8, adhesive is dispensed from adhesive container 6 through adhesive dispenser line 4. The adhesive is dispersed through adhesive dispenser 3 onto the puzzle cut seam between the two ends of the puzzle cut belt, and between the mutually mating elements. Subsequently, a UV cure is accomplished by exposing the adhesive between the two ends of the belt to a UV light source, both from above the belt (through direct UV source 1) and from below the belt (through indirect UV source 9). UV light from UV power source 5 is transported through direct UV source line 2 and is illuminated along the puzzle cut seam by direct UV source 1. Indirect UV source 9 contains a UV power source also. UV light is exposed along the seam by indirect UV light source 9 through aperture 26 of belt positioning device 8. The optional base 18 secures indirect light source 9 and belt securing device 8. An xyz positioning device 7 positions the adhesive and UV lines and dispensers in x, y, and z planes to correspond to the seam of the puzzle cut belt and to Ocorrespond with the aperture 26 of the belt positioning device 8. The xyz positioning device 7 can be operated by a computer which is electronically connected therewith. The computer can be programmed to move the dispenser 3 and direct UV source 1 for various puzzle cut patterns and dimensions, and to facilitate seaming of a multitude of seam widths, lengths and thicknesses.

Preferably, the adhesive is administered to the puzzle cut belt by movement of the adhesive dispenser 3 dispensing adhesive in a even distribution along the puzzle cut belt. The dispensing of the adhesive occurs along the two ends of the belt which corresponds to the aperture 26 of belt positioning device 8. In this embodiment, the adhesive disperser 3 travels along the aperture 26 dispensing adhesive, making one pass along the puzzle cut belt. Adhesive dispenser 3 returns to its original starting position after dispensing the adhesive. Adhesive dispenser preferably does not dispense any adhesive on the return pass, although the apparatus may be configured to dispense on the return pass in an alternative embodiment. In one embodiment, subsequent to the dispensing of the adhesive and return of the dispenser, the direct UV source 1 travels along the same path as the adhesive dispenser 3. The direct UV source 1 and the indirect UV source 9 illuminate and cure the seam as the direct UV source 1 travels along the aperture 26 corresponding with the two ends of the puzzle cut belt. In an alternative embodiment, the adhesive dispenser 3 and direct UV source 3 may travel along the aperture path simultaneously, with the direct UV source 1 following adhesive dispenser 3. The speed for each pass of the dispenser(s) varies, depending on the viscosity of the adhesive, the length of the puzzle cut belt, and other factors. Preferably, the speed of the dispensing is from about 0.1 to about 30 inches/second, preferably from about 1 to about 5 inches/second. A desirable speed in terms of half a minute time period is from about 90 inches/30 seconds.

In a preferred embodiment of the puzzle cut seaming apparatus as shown in FIG. 11, a belt securing device 23 is positioned over the belt positioning device 8 so as to interlock the belt securing device 23 and belt positioning device 8. As shown in FIG. 12, the puzzle cut belt 29 is placed on belt positioning device 8. Belt securing device 23 is positioned over the puzzle cut belt 29. Belt securing device 23 secures the puzzle cut belt in position for dispensing of the adhesive and for UV curing of the seam. As shown in FIG. 11, belt securing device 23 comprises handles 24, lateral sides 25 and transverse sides 28, and fits securely over belt positioning device 8. Belt securing device 23 comprises a material housing aperture 26. The material housing aperture 26 may or may not be transparent. Preferably, the material housing aperture 26 is a transparent material. Belt securing device 23 includes aperture 26 through which adhesive can be dispensed onto the belt to be seamed, and through which UV light from direct UV source can be illuminated in order to UV cure the puzzle cut seam to be exposed to the adhesive dispenser and UV source.

In a preferred embodiment as depicted in FIG. 12, belt positioning device 8 comprises base 18 which houses aperture 26, and thereover, releasing layer 27. Aperture 26 of belt positioning device 8 corresponds in dimensions (length, width and depth) to aperture 26 of belt securing device 23. Releasing layer 27 may or may not be transparent. In a preferred embodiment, releasing layer 27 is transparent and in an even more preferred embodiment, comprises a silicone or fluoropolymer material. In a particularly preferred embodiment, transparent releasing layer 27 comprises a polyethylene terephthalate layer, with a thin layer of silicone or fluorosilicone thereover. A preferred silicone material is silicone coated film from Bertek, St. Albans, Vt.

The apparatus may be designed to function via a computer program, wherein the apparatus is programmed to position a first section of a belt, dispense a line of adhesive, cure with UV light, position the belt for curing a second un-seamed portion of the belt, dispense a line of adhesive and cure, and repeat these steps until an entire belt is seamed. The apparatus can also be programmed to dispense adhesive into various puzzle cut seam shapes. In addition, the apparatus can be programmed to place a larger amount of adhesive at certain positions along the seam. In a preferred embodiment, a larger amount of adhesive is dispensed at the beginning and end of the seam.

Preferably, the UV wavelengths for both the direct UV source and indirect UV source are the same. Preferably, the wavelengths range from about 200 to about 700 nanometers, preferably from about 320 to about 480 nanometers. Preferably, the direct UV source is more intense than the indirect UV source. In an alternative embodiment, light from direct UV source is relatively intense, and there is no need for indirect UV light source. UV intensities depend on the power of the UV source lamp and distance from the applied adhesive. Lamp powers range from about 20 to about 200 watts and distances range from about 0.001 to about 4 inches, preferably from about 0.5 to about 3 inch.

The seam height and seam strength can be varied by varying the amount of adhesive applied to the seam, and/or the viscosity of the adhesive and/or by varying the position of the adhesive dispenser 3 from the surface of the belt. Preferably, the adhesive dispenser is positioned a height of from about 0.01 to about 4 inches from the puzzle cut belt, preferably from about 0.02 to about 0.08 inches.

Preferably, the dispensing units have a pressure of from about 4 to about 12 psi, and more preferably from about 6 to about 10 psi. The orifice diameter of the dispensing units are preferably from about 0.004 to about 0.61 inches, more preferably about 0.054 inches. Preferably, the speed of the adhesive dispenser is less than about 30 inches/second, more preferably less than about 0.6 inches/second. The speed of the direct UV source is preferably less than about 30 inches/second, more preferably less than about 0.3 inches/second. The intensity of the UV light is preferably from about 500 to about 600 milliwatts/sq-cm. Seam adhesive may be finished in some way; for example passing a squeegee or blade over the adhesive before UV exposure. Higher viscosity adhesives can be forced into the crevice.

Following fabrication, the belt may be finished by way of buffing or sanding. In addition, an overcoating may be applied using known procedures. Examples of suitable overcoatings include polymer coatings, adhesive coatings, release layer coatings, and the like. Specifically preferred overcoatings include polymer coatings comprising polycarbonate transport layers. The overcoatings may or may not contain conductive fillers such as metal oxides, graphite, carbon black, or like conductive fillers.

The belts prepared using embodiments disclosed herein, have increased pull strengths of up to about 50, preferably from about 15 to about 50, and particularly preferred of from about 35 to about 40 pounds/inch. The flex life of the belts (for example, flexing around 25 mm diameter rollers) is up to about 10,000,000, preferably from about 550,000 to about 8,500,000, and particularly preferred of from about 1,000,000 to about 8,500,000 cycles. In addition, in a preferred embodiment, adhesion between photoreceptor layers will fail before seam failure occurs.

Because ultraviolet light instead of heat is used to cure the adhesive, there is a reduction in spattering of melted adhesive material. Spattering of belt material causes peaks which increase the effective seam height and interfere with charging corotrons and other elements placed in proximity to the belt. Increasing the distance increases power consumption and restricts the use of some architectures. Therefore, the ripple effect is reduced or eliminated. Some substrate materials are biaxially oriented such as (PET). The high temperatures relax the orientation causing a ripple. Ripple creates an increase in height which causes problems as described above.

The ripple in the overlap seams is from about 0.18 to about 0.46 mm. This is compared to known puzzle cut seams which have demonstrated ripple in the seam of from about 0.1 to about 0.15 mm. The decrease in ripple allows for a reduction or elimination in interference by the ripple with other components which the belt may come in contact with during cycling. The reduction in ripple effect is especially advantageous in systems which comprise hybrid scavengeless development components which are very sensitive to mechanical noise and other disturbances that may be caused by belt ripple. Puzzle cut seams prepared with little or no ripple reduce or eliminate disturbance of HSD components.

The seam height of the belts is reduced to practically nil, in embodiments. The seam height is further reduced by use of the fixture prior to curing the ultraviolet adhesive. The seam height differential between the seamed portion of the belt and an unseamed portion of the belt is virtually nil, or from about 0.001 to about 50 microns.

In addition, the belts provide for a decrease in belt fabrication time. Normally, curing of UV curable adhesives requires UV cure time of about 30 minutes. The present invention allows for a reduction in cure time to less than about 1 minute, preferably from about 10 seconds to about 1 minute. The cure time for the belt is from about 1.9 seconds/inch to about 60 seconds/inch of belt.

Figure 9:
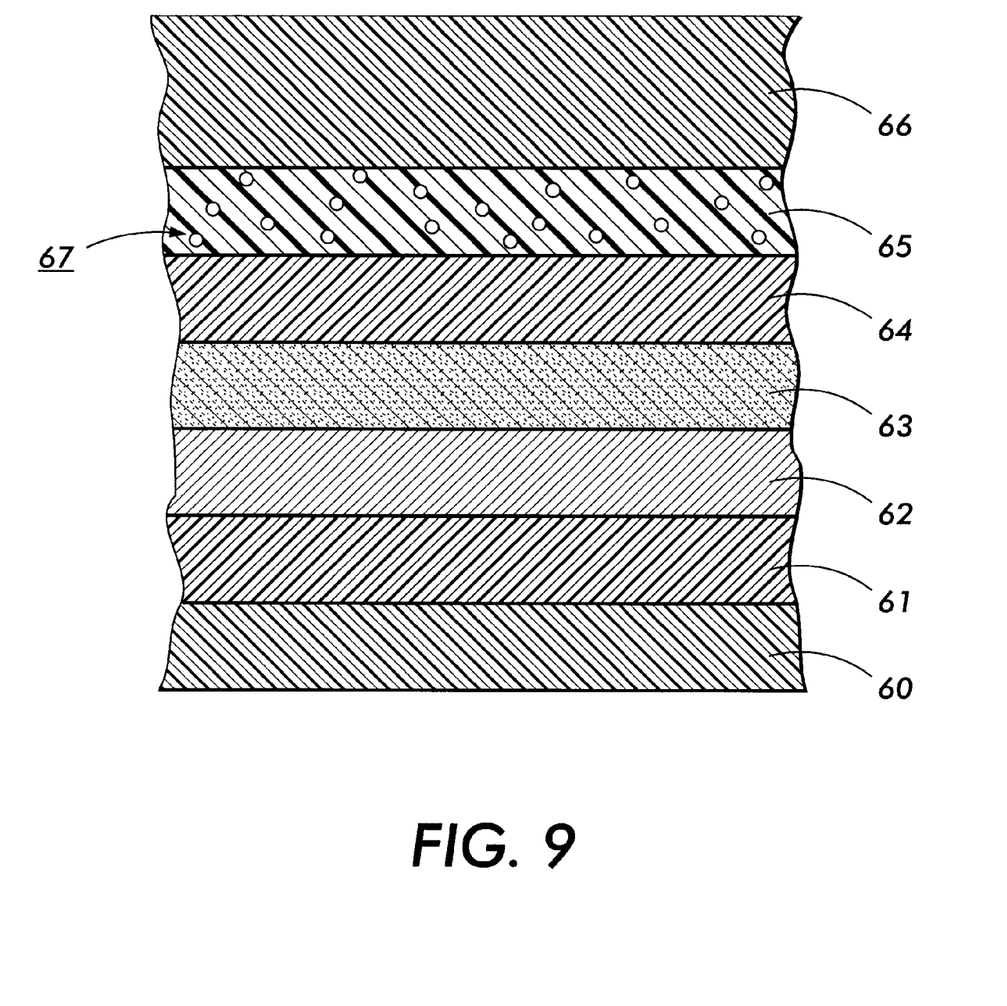
FIG. 9 is an enlarged cross-sectional view of a belt according to a preferred embodiment of the invention and demonstrates a seven layer photoreceptor belt.

An example of a preferred belt used in combination with the ultraviolet curable adhesive is a layered photoreceptor belt, as depicted in FIG. 9. The belt comprises the following layers in the following order. A substrate 61 comprising a polyester, for example, polyethylene terephthalate is present in the seven layer photoreceptor belt. An anticurl backing layer 60 comprising a polymer such as polycarbonate is present on the underside of the substrate. On the upper side of the substrate 61 is present a conductive layer 62 comprising one or more metals, for example, zirconium on top of titanium. Present on the conductive layer 62 is a charge blocking layer 63 comprising an amino siloxane, such as a siloxane formed from a gamma aminopropyl triethoxy silane. Present on the charge blocking layer 63 is an adhesive layer 64 which may comprise an interfacial layer such as polyester. Present on the adhesive layer 64 is charge generating layer 65 comprising particles 67 dispersed in a film forming polymer, for example crystal particles such as trigonal selenium particles dispersed in a film forming binder. Present on the layer 65 is a charge transport layer 66 which can comprise a polymer such as polycarbonate in combination with a small molecule such as an aryl amine.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I
Preparation of Photoreceptor Belt

An electrophotographic imaging member web was prepared by providing a roll of titanium coated biaxially oriented thermoplastic polyester (MELINEX® 442, available from ICI Americas, Inc.) substrate having a thickness of about 3 mils (76.2 micrometers) and applying thereto, using a gravure applicator, a solution containing 50 parts by weight 3-aminopropyltriethoxysilane, 50.2 parts by weight distilled water, 15 parts by weight acetic acid, 684.8 parts by weight of 200 proof denatured alcohol, and 200 parts by weight heptane. This layer was then dried to a maximum temperature of 290° F. (143.3° C.) in a forced air oven. The resulting blocking layer had a dry thickness of about 0.05 micrometers.

An adhesive interface layer was then prepared by applying to the blocking layer a wet coating containing 5 percent by weight, based on the total weight of the solution, of polyester adhesive (MOR-ESTER® 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of about 0.07 micrometers.

The adhesive interface layer was thereafter coated with a photogenerating layer containing 7.5 percent by weight volume trigonal selenium, 25 percent by volume N,N'- diphenyl-N,N'-bis(3-methylphenyl)-1,1'biphenyl-4,4'-diamine, and 67.5 percent by volume polyvinylcarbazole. This photogenerating layer was prepared by introducing 160 grams polyvinylcarbazole and 2,800 mls of a 1:1 volume ratio of a mixture of tetrahydrofuran and toluene into a 400 oz. amber bottle. To this solution was added 160 grams of trigonal selenium and 20,000 gms of ⅛ inch (3.2 millimeters) diameter stainless steel shot. This mixture was then placed on a ball mill for from about 72 to about 96 hours. Subsequently, 500 grams of the resulting slurry were added to a solution of 36 grams of polyvinylcarbazole and 20 grams of N,N'-diphenyl-N,N'-bis(3-methylphenyl)-1,1'biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of about 0.5 mil (12.7 micrometers). However, a strip about 3 mm wide along one edge of the coating web, having the blocking layer and adhesive layer, was deliberately left uncoated without any of the photogenerating layer material to facilitate adequate electrical contact by the ground strip layer that is applied later. This photogenerating layer was dried to a maximum temperature of 280° F. (138° C.) in a forced air oven to form a dry thickness photogenerating layer having a thickness of about 2.0 micrometers.

This coated imaging member web was simultaneously overcoated with a charge transport layer and a ground strip layer by co-extrusion of the coating materials. The charge transport layer was prepared by introducing into an amber glass bottle in a weight ratio of 1:1 N,N'-diphenyl-N,N'-bis(3-methylphenyl)-1,1'-biphenyl-4,4'-diamine and MAKROLON® 5705, a polycarbonate resin having a molecular weight of about 120,000 and commercially available from Farbensabricken Bayer A.G. The resulting mixture was dissolved to give 15 percent by weight solid in methylene chloride. This solution was applied on the photogenerating layer by extrusion to form a coating which upon drying gave a thickness of about 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 grams of polycarbonate resin (MAKROLON® 5705, 7.87 percent by total weight solids, available from Bayer A.G.), and 332 grams of methylene chloride in a carboy container. The container was covered tightly and placed on a roll mill for about 24 hours until the polycarbonate was dissolved in the methylene chloride. the resulting solution was mixed for from about 15 to about 30 minutes with about 93 grams of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 240° F. (116° C.) in a forced air oven to simultaneously dry both the charge transport layer and the ground strip.

An anti-curl coating was prepared by combining 88.2 grams of polycarbonate resin (MAKROLON® 5705, available from Goodyear Tire and Rubber Company) and 900.7 grams of methylene chloride in a carboy container to form a coating solution containing about 8.9 percent solids. The container was covered tightly and placed on a roll mill for about 24 hours until the polycarbonate and polyester were dissolved in the methylene chloride. An amount of 4.5 grams of silane-treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to product a dried coating layer having a thickness of 13.5 micrometers.

Example II

Preparation of Puzzle Cut Seam Using Puzzle Cut Seaming Apparatus

The electrophotographic imaging member web of Example I having a width of 353 millimeters, was cut into a rectangular sheet of about 559.5 millimeters in length. The opposite ends of each imaging member were placed on the belt positioning device over the transparent releasing layer. The mutually mating elements were interlocked securely in place. The belt securing device was placed on the belt, the two ends of the belt overlapping in the puzzle cut configuration. The puzzle cut mating surfaces were thereby secured in place for seaming.

An optimum amount 0.05 g/inch of adhesive was applied from the adhesive dispenser in accordance with the present invention. The adhesive was applied at a rate of 30 inches/90 seconds. After applying an optimum amount of adhesive, the xyz positioning equipment is positioned so that the direct UV source pen is positioned over the seam adhesive. A bead of UV adhesive was cured at a speed of 30inches/90 seconds. The adhesive is also cured from an indirect UV source that is below the belt positioning device.

Example III

Preparation of Puzzle Cut Seam Using Known Methods

The electrophotographic imaging member web of Example I having a width of 353 millimeters, was cut into a rectangular sheet of about 559.5 millimeters in length. The opposite ends of each imaging member were overlapped 1 mm and joined by an ultrasonic energy seam welding process using a 40 Khz horn frequency to form a seamed electrophotographic imaging member belt.

The ultrasonically welded belt had two 0.75 mm seam splashes, one on the top surface of the belt over the charge transport layer while the other on the top surface inside belt over the anti-curl backing layer, adjacent the 1 mm overlapped seam. The welded seam had a 75 micrometers added thickness than that of the main body of the belt when measured with a micrometer. This ultrasonic welded seam represents a known seam design.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end together which form a seam which extends linearly across a width of said belt, wherein said first end and second end both comprise mutually mating elements in a puzzle cut pattern, said mutually mating elements interlocking to form said seam, wherein said seam comprises an ultraviolet curable adhesive to bond said mutually mating elements of said first end and said second end, wherein there is virtually no thickness differential between said seam and adjacent interlocking mutually mating elements, and wherein said seam has a pull strength of from about 15 to about 50 pounds/inch.

2. A belt in accordance with claim 1, wherein said pull strength is from about 35 to about 40 pounds/inch.

3. A belt in accordance with claim 1, wherein said belt has a flex life of from about 550,000 to about 8,500,000 cycles.

4. A belt in accordance with claim 3, wherein said belt has a flex life of from about 1,000,000 to about 8,500,000 cycles.

5. A belt in accordance with claim 1, wherein a height differential between a seamed portion of the belt and an unseamed portion of the belt is virtually nil.

6. A belt in accordance with claim 5, wherein said height differential is from about 0.001 to about 50 micrometers.

7. A belt in accordance with claim 1, wherein the seam ripple is from about 0.18 to about 0.46 millimeters.

8. A belt in accordance with claim 1, wherein said ultraviolet curable adhesive has a viscosity of from about 100 to about 5,000 centepoise.

9. A belt in accordance with claim 8, wherein said viscosity is from about 200 to about 1,000 centepoise.

10. A belt in accordance with claim 1, wherein said belt is a photoreceptor belt.

11. A belt in accordance with claim 10, wherein said mutually mating elements comprise a first member and a second member, wherein the first member comprises a first receptacle and a first projection, and the second member comprises a second receptacle and a second projection, and further wherein said first receptacle of the first member receives the second projection of the second member, and the second receptacle of the second member receives the first projection of the first member.

12. A belt in accordance with claim 11, wherein said mutually mating elements are curved.

13. A belt in accordance with claim 10, wherein said photoreceptor belt comprises a substrate.

14. A belt in accordance with claim 13, wherein said substrate comprises polyester.

15. A belt in accordance with claim 13, further comprising an outer layer positioned on an upper side of said substrate.

16. A belt in accordance with claim 15, wherein said outer layer comprises a polycarbonate.

17. A belt in accordance with claim 15, further comprising a backing layer positioned on an underside of said substrate.

18. A belt in accordance with claim 17, wherein said backing layer comprises a polycarbonate.

19. An image forming apparatus for forming images on a recording medium comprising:

a charge-retentive surface to receive an electrostatic latent image thereon, wherein said charge-retentive surface comprises an endless seamed flexible belt comprising a first end and a second end together which form a seam which extends linearly across a width of said belt, wherein said first end and second end both comprise mutually mating elements in a puzzle cut pattern, said mutually mating elements interlocking to form said seam, wherein said seam comprises an ultraviolet curable adhesive to bond said mutually mating elements of said first end and said second end, wherein there is virtually no thickness differential between said seam and adjacent interlocking mutually mating elements, and wherein said seam has a pull strength of from about 15 to about 50 pounds/inch;

a development component to apply toner to said charge-retentive surface to develop said electrostatic latent image to form a developed image on said charge retentive surface;

a transfer film component to transfer the developed image from said charge retentive surface to a copy substrate; and a fixing component to fuse said developed image to said copy substrate.

* * * * *